United States Patent
Katsuta

(10) Patent No.: US 9,406,443 B2
(45) Date of Patent: Aug. 2, 2016

(54) CERAMIC ELECTRONIC COMPONENT

(71) Applicant: Murata Manufacturing Co., Ltd., Nagaokakyo-shi, Kyoto-fu (JP)

(72) Inventor: Seiji Katsuta, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 177 days.

(21) Appl. No.: 14/496,066

(22) Filed: Sep. 25, 2014

(65) Prior Publication Data

US 2016/0020028 A1   Jan. 21, 2016

(30) Foreign Application Priority Data

Oct. 25, 2013 (JP) .................... 2013-221785
Jul. 30, 2014 (JP) .................... 2014-154882

(51) Int. Cl.
| | |
|---|---|
| *H01G 4/30* | (2006.01) |
| *H01G 4/232* | (2006.01) |
| *H01G 4/012* | (2006.01) |
| *H01G 4/008* | (2006.01) |
| *H01G 4/12* | (2006.01) |

(52) U.S. Cl.
CPC ........... *H01G 4/2325* (2013.01); *H01G 4/0085* (2013.01); *H01G 4/012* (2013.01); *H01G 4/30* (2013.01); *H01G 4/1227* (2013.01); *H01G 4/1236* (2013.01); *H01G 4/1245* (2013.01)

(58) Field of Classification Search
None
See application file for complete search history.

(56) References Cited

U.S. PATENT DOCUMENTS

| | | | |
|---|---|---|---|
| 6,381,117 B1 | 4/2002 | Nakagawa et al. | |
| 2011/0007449 A1* | 1/2011 | Seo | H01G 4/232 361/321.2 |
| 2012/0188684 A1* | 7/2012 | Akazawa | H01G 4/012 361/321.2 |
| 2012/0306325 A1* | 12/2012 | Kim | H01G 4/30 310/366 |
| 2013/0242457 A1* | 9/2013 | Lee | H01G 4/008 361/301.4 |
| 2013/0242462 A1* | 9/2013 | Kawano | H01G 4/005 361/321.1 |
| 2014/0098454 A1* | 4/2014 | Kwag | H01G 4/2325 361/301.4 |

FOREIGN PATENT DOCUMENTS

| | | |
|---|---|---|
| JP | 2001-076957 A | 3/2001 |
| JP | 2007-67239 A | 3/2007 |

OTHER PUBLICATIONS

Official Communication issued in corresponding Korean Patent Application No. 10-2014-0144402, mailed on Jan. 18, 2016.

* cited by examiner

*Primary Examiner* — Dion R Ferguson
(74) *Attorney, Agent, or Firm* — Keating & Bennett, LLP

(57) ABSTRACT

In a ceramic electronic component, when a distance between a first end surface and an edge of a portion of a first baked electrode layer disposed on a second principal surface in a length direction is A, a distance between the first end surface and an effective region in the length direction is B, and a distance between the first end surface and an edge of a portion of a first resin-containing electrode layer disposed on the second principal surface in the length direction is C, A<B<C is satisfied and A/B is about 0.86 or less.

20 Claims, 4 Drawing Sheets

CERAMIC ELECTRONIC COMPONENT

BACKGROUND OF THE INVENTION

1. Field of the Invention

The present invention relates to a ceramic electronic component.

2. Description of the Related Art

Monolithic ceramic electronic components, such as monolithic ceramic capacitors, are included in various types of electronic devices. Monolithic ceramic capacitors generally include a ceramic body and first and second electrodes that are arranged in the ceramic body and that oppose each other with ceramic portions interposed therebetween.

In recent years, environments in which monolithic ceramic electronic components are used have become more severe. For example, monolithic ceramic electronic components included in mobile devices, such as cellular phones and portable audio players, are required to be resistant to shock when the mobile devices are dropped. More specifically, it is necessary to prevent the monolithic ceramic electronic components from becoming separated from mounting boards or from cracking due to shock when the mobile devices are dropped.

Monolithic ceramic electronic components, such as electronic control units (ECU), included in on-vehicle devices are required to be heat resistant. More specifically, it is necessary to prevent the monolithic ceramic electronic components from cracking even when the monolithic ceramic electronic components receive a bending stress generated by thermal contraction or expansion of mounting boards or a tensile stress applied to outer electrodes. Ceramic bodies crack when the above-described bending stress or tensile stress exceeds the strength of the ceramic bodies.

Japanese Unexamined Patent Application Publication No. 2001-76957, for example, describes a monolithic ceramic electronic component including an outer electrode that includes a resin-containing electrode layer made of a resin containing metal powder. In the monolithic ceramic electronic component according to Japanese Unexamined Patent Application Publication No. 2001-76957, the resin-containing electrode layer buffers external stress applied to a ceramic body. Therefore, the ceramic body does not easily crack.

However, even when the resin-containing electrode layer according to Japanese Unexamined Application Publication No. 2001-76957 is provided, there is a risk that a capacitor body will crack before the stress applied by a board is buffered by the resin-containing electrode layer. In addition, when the stress applied by the board is not sufficiently absorbed by the resin-containing electrode layer, there is a risk that cracks will be formed so as to extend into the capacitor body from an edge of a base electrode layer. When the cracks extend to an effective layer of inner electrodes, there is a risk of short-circuiting.

SUMMARY OF THE INVENTION

Preferred embodiments of the present invention provide a ceramic electronic component that does not easily crack and in which short-circuiting does not easily occur even when cracks are formed.

According to a preferred embodiment of the present invention, a ceramic electronic component includes a ceramic body, first and second inner electrodes, and an outer electrode.

The ceramic body includes first and second principal surfaces, first and second side surfaces, and first and second end surfaces. The first and second principal surfaces extend in a length direction and a width direction. The first and second side surfaces extend in the length direction and a thickness direction. The first and second end surfaces extend in the width direction and the thickness direction.

The ceramic body includes an effective region and a region different from the effective region. The effective region is a region in which the first and second inner electrodes oppose each other in the thickness direction. The region different from the effective region is a region that is closer to the first end surface than the effective region is, and in which one of the first and second inner electrodes is disposed.

The first and second inner electrodes are arranged in the ceramic body. The first and second inner electrodes oppose each other in the thickness direction.

The outer electrode is electrically connected to the first inner electrode or to the second inner electrode. The outer electrode extends from the first end surface to the second principal surface.

The outer electrode includes a baked electrode layer and a resin-containing electrode layer. The baked electrode layer is provided on the ceramic body. The resin-containing electrode layer includes a conductive material and a resin, and covers the baked electrode layer.

When a distance between the first end surface and an edge of a portion of the baked electrode layer disposed on the second principal surface in the length direction is A, a distance between the first end surface and the effective region in the length direction is B, and a distance between the first end surface and an edge of a portion of the resin-containing electrode layer disposed on the second principal surface in the length direction is C, the ceramic electronic component satisfies A<B<C, and A/B preferably is about 0.86 or less, for example.

Preferably, A/B is about 0.33 or more, for example.

According to various preferred embodiments of the present invention, a ceramic electronic component that does not easily crack and in which short-circuiting does not easily occur even when cracks are formed is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
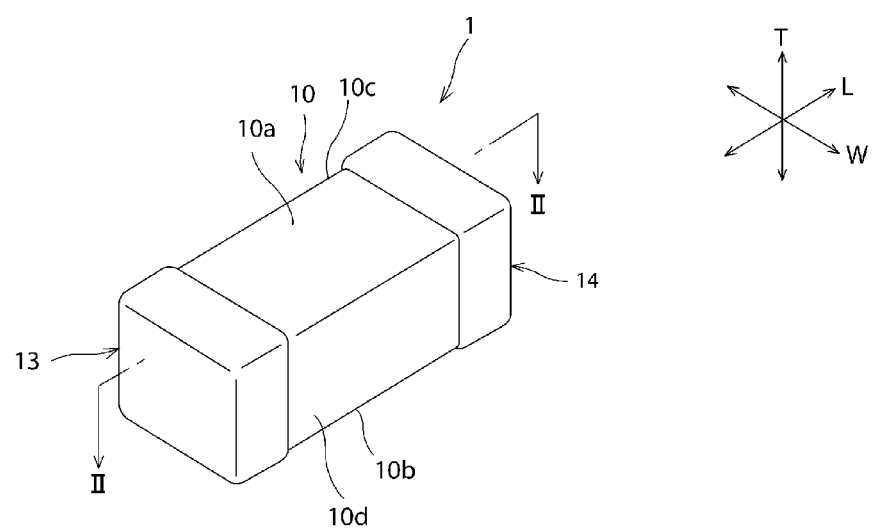
FIG. 1 is a schematic perspective view of a ceramic electronic component according to a first preferred embodiment.

Preferred embodiments of the present invention will now be described. The preferred embodiments are merely examples, and the present invention is not limited to the preferred embodiments in any way.

In each of the figures referred to in the preferred embodiments, components having the same or substantially the same functions are denoted by the same reference numerals. The figures referred to in the preferred embodiments are drawn schematically. Dimensional ratios and proportions of objects drawn in the figures may differ from the actual dimensional ratios and proportions of the objects. The dimensional ratios and proportions of the objects may also differ between the figures. Specific dimensional ratios and proportions of the objects are to be determined based on the following description.

The structure of a ceramic electronic component 1 will now be described.

First Preferred Embodiment

Figure 2:
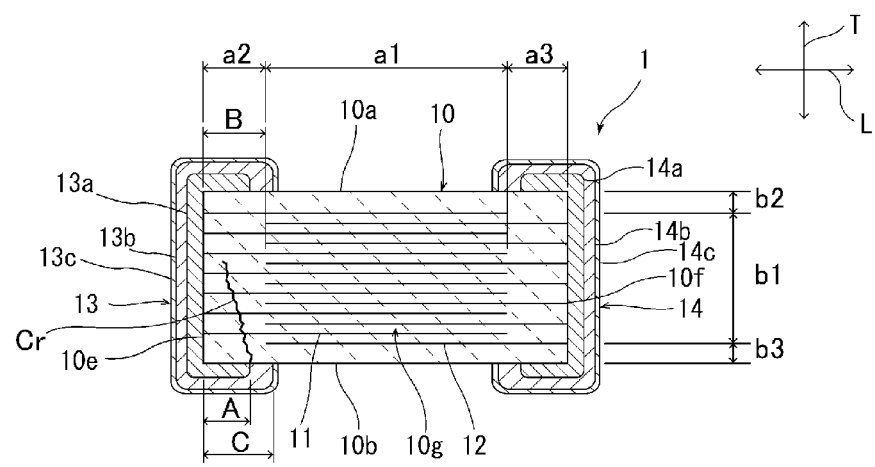
FIG. 2 is a schematic sectional view of FIG. 1 taken along line II-II.

FIG. 1 is a schematic perspective view of a ceramic electronic component according to a first preferred embodiment of the present invention. FIG. 2 is a schematic sectional view of FIG. 1 taken along line II-II.

The ceramic electronic component 1 illustrated in FIGS. 1 and 2 may preferably be a ceramic capacitor, a piezoelectric component, a thermistor, an inductor, or other suitable component, for example.

The ceramic electronic component 1 includes a ceramic body 10 having a rectangular or substantially rectangular parallelepiped shape. The ceramic body 10 includes first and second principal surfaces 10a and 10b, first and second side surfaces 10c and 10d (see FIG. 1), and first and second end surfaces 10e and 10f (see FIG. 2). The first and second principal surfaces 10a and 10b extend in a length direction L and a width direction W. The first and second side surfaces 10c and 10d extend in a thickness direction T and the length direction L. The first and second end surfaces 10e and 10f extend in the thickness direction T and the width direction W. The length direction L, the width direction W, and the thickness direction T are orthogonal to each other.

In the present invention, the "rectangular or substantially rectangular parallelepiped shape" includes rectangular parallelepiped shapes including rounded corners and edges. In other words, objects having a "rectangular or substantially rectangular parallelepiped shape" are all objects including the first and second principal surfaces, the first and second side surfaces, and the first and second end surfaces. In addition, projections and recesses, for example, may be provided over the entire, substantially the entire, or a partial area of each of the principal surfaces, the side surfaces, and the end surfaces.

The dimensions of the ceramic body 10 are not particularly limited. For example, the ceramic body 10 preferably has a thickness of about 0.2 mm to about 3.0 mm, a length of about 0.4 mm to about 5.7 mm, and a width of about 0.2 mm to about 5.0 mm.

The ceramic body 10 is preferably made of a ceramic material suitable for the function of the ceramic electronic component 1. More specifically, in the case where the ceramic electronic component 1 is a capacitor, the ceramic body 10 may preferably be made of a dielectric ceramic. Examples of dielectric ceramics include $BaTiO_3$, $CaTiO_3$, $SrTiO_3$, and $CaZrO_3$. The ceramic body 10 may also include a sub-component, such as a Mn compound, a Mg compound, a Si compound, a Fe compound, a Cr compound, a Co compound, a Ni compound, or a rare-earth compound, as appropriate in accordance with the characteristics required of the ceramic electronic component 1.

In the case where the ceramic electronic component 1 is a piezoelectric component, the ceramic body may preferably be made of a piezoelectric ceramic. Non-limiting examples of piezoelectric ceramics include a lead zirconate titanate (PZT) ceramic.

In the case where the ceramic electronic component 1 is a thermistor, the ceramic body may preferably be made of a semiconductor ceramic. Non-limiting examples of semiconductor ceramics include a spinel ceramic.

In the case where the ceramic electronic component 1 is an inductor, the ceramic body may preferably be made of a magnetic ceramic. Non-limiting examples of magnetic ceramics include a ferrite ceramic.

As illustrated in FIG. 2, a plurality of first inner electrodes 11 and a plurality of second inner electrodes 12 are provided in the ceramic body 10.

The first inner electrodes 11 preferably have a rectangular or substantially rectangular shape. The first inner electrodes 11 are parallel or substantially parallel to the first and second principal surfaces 10a and 10b (see FIG. 2). In other words, the first inner electrodes 11 extend in the length direction L and the width direction W. The first inner electrodes 11 are exposed at the first end surface 10e, and are not exposed at the first and second principal surfaces 10a and 10b, the first and second side surfaces 10c and 10d, and the second end surface 10f.

The second inner electrodes 12 preferably have a rectangular or substantially rectangular shape. The second inner electrodes 12 are parallel or substantially parallel to the first and second principal surfaces 10a and 10b (see FIG. 2). In other words, the second inner electrodes 12 extend in the length direction L and the width direction W. Thus, the second inner electrodes 12 and the first inner electrodes 11 are parallel or substantially parallel to each other. The second inner electrodes 12 are exposed at the second end surface 10f, and are not exposed at the first and second principal surfaces 10a and 10b, the first and second side surfaces 10c and 10d, and the first end surface 10e.

The first and second inner electrodes 11 and 12 are alternately arranged in the thickness direction T. The first and second inner electrodes 11 and 12 that are adjacent to each other in the thickness direction T oppose each other with a ceramic portion 10g interposed therebetween. A region in which the first inner electrodes 11 and the second inner electrodes 12 oppose each other in the thickness direction corresponds to a portion that provides a capacity-generating function of the electronic component. Therefore, the region in which the first inner electrodes 11 and the second inner electrodes 12 oppose each other in the thickness direction is referred to as an effective region. As illustrated in FIG. 2, the effective region a1 is located in a central region in the length direction L. In a region closer to the first end surface 10e than the effective region a1 is in the length direction L, the first inner electrodes 11 and the second inner electrodes 12 do not oppose each other in the thickness direction T. The region closer to the first end surface 10e than the effective region a1 defines an ineffective area a2 that does not provide the capacity-generating function of the electronic component. Similarly, in a region closer to the second end surface 10f than the effective region a1 is, the first inner electrodes 11 and the second inner electrodes 12 do not oppose each other in the thickness direction T. The region closer to the second end surface 10f than the effective region a1 defines an ineffective area a3 that does not provide the capacity-generating function of the electronic component.

In the thickness direction T, regions on both sides of the effective region a1 in which no first inner electrodes 11 or second inner electrodes 12 are provided are referred to as outer layer regions b2 and b3, and the effective region a1 is referred to as an inner layer region b1.

The thickness of each ceramic portion 10g may be about 0.4 μm to about 100 μm, and is preferably about 1.5 μm to about 80 μm, for example. In the case where the ceramic electronic component 1 is a capacitor, each ceramic portion 10g is preferably thin in order to increase the capacity of the ceramic electronic component 1.

The first and second inner electrodes 11 and 12 may be made of an appropriate conductive material. For example, the first and second inner electrodes 11 and 12 may preferably be made of a metal selected from a group including Ni, Cu, Ag, Pd, and Au, or an alloy, such as an Ag—Pd alloy, containing one or more metals selected from the group including Ni, Cu, Ag, Pd, and Au.

Preferably, the thickness of the first and second inner electrodes 11 and 12 is, for example, about 0.2 μm to about 2.0 μm.

As illustrated in FIGS. 1 and 2, the ceramic electronic component 1 includes first and second outer electrodes 13 and 14. The first outer electrode 13 is electrically connected to the first inner electrodes 11 on the first end surface 10e. The second outer electrode 14 is electrically connected to the second inner electrodes 12 on the second end surface 10f.

The first outer electrode 13 is preferably arranged so as to extend from the first end surface 10e to the first and second principal surfaces 10a and 10b and the first and second side surfaces 10c and 10d. The second outer electrode 14 is preferably arranged so as to extend from the second end surface 10f to the first and second principal surfaces 10a and 10b and the first and second side surfaces 10c and 10d.

The first and second outer electrodes 13 and 14 may be made of an appropriate conductive material. Also, the first and second outer electrodes 13 and 14 may include a plurality of conductive films.

More specifically, the first outer electrode 13 includes a first baked electrode layer 13a, and the second outer electrode 14 includes a second baked electrode layer 14a.

The first baked electrode layer 13a is arranged so as to cover the end surface 10e of the ceramic body and extend to desired locations on the principal surfaces 10a and 10b and the side surfaces 10c and 10d. The second baked electrode layer 14a is arranged so as to cover the end surface 10f of the ceramic body 10 and extend to desired locations on the principal surfaces 10a and 10b and the side surfaces 10c and 10d.

A first resin-containing electrode layer 13b is provided on the first baked electrode layer 13a. A second resin-containing electrode layer 14b is provided on the second baked electrode layer 14a. A first plating layer 13c is provided on the first resin-containing electrode layer 13b. A second plating layer 14c is provided on the second resin-containing electrode layer 14b.

The first and second baked electrode layers 13a and 14a are preferably formed by, for example, applying conductive paste including a conductive metal and a glass and burning the conductive paste. The conductive metal included in the first and second baked electrode layers 13a and 14a may preferably be, for example, Cu, Ni, Ag, Pd, an Ag—Pd alloy, or Au. The glass included in the first and second baked electrode layers 13a and 14a may preferably be, for example, a glass containing B, Si, Ba, Mg, Al, or Li.

Each of the first and second baked electrode layers 13a and 14a may be either baked together with the ceramic body 10, or be formed by applying the conductive paste to the ceramic body 10 and baking the conductive paste.

Each of the first and second baked electrode layers 13a and 14a may include a plurality of layers. In this case, the thickness of the first electrode layer, more specifically, the thickness of the thickest portion of the first electrode layer, is preferably about 10 μm to about 100 μm, for example. Similar to the first and second baked electrode layers 13a and 14a, each of the first and second resin-containing electrode layers 13b and 14b and the first and second plating layers 13c and 14c may also include a plurality of layers.

The first resin-containing electrode layer 13b covers the first baked electrode layer 13a. The second resin-containing electrode layer 14b covers the second baked electrode layer 14a. More specifically, the first resin-containing electrode layer 13b is disposed on a portion of the first baked electrode layer 13a disposed on the first end surface, and preferably extends to portions of the first baked electrode layer 13a disposed on the first principal surface and the first side surface. The second resin-containing electrode layer 14b is disposed on a portion of the second baked electrode layer 14a disposed on the second end surface, and preferably extends to portions of the second baked electrode layer 14a disposed on the second principal surface and the second side surface.

Preferably, the thickness of the first and second resin-containing electrode layers 13b and 14b is, for example, about 10 μm to about 150 μm.

The first and second resin-containing electrode layers 13b and 14b include a conductive material and a resin. Since the first and second resin-containing electrode layers 13b and 14b include a resin, the first and second resin-containing electrode layers 13b and 14b are more flexible than, for example, the plating layers and the conductive layers formed by baking conductive paste. Therefore, even when the ceramic electronic component 1 receives a physical shock or a shock due to the heat cycle, the first and second resin-containing electrode layers 13b and 14b define and serve as buffer layers, and cracking of the ceramic electronic component 1 is prevented or minimized.

The conductive material may be, for example, Ag or metal powder coated with Ag. The metal powder is preferably Cu or Ni. The conductive material may instead be Cu subjected to an anti-oxidation treatment.

The reason why Ag is used as the conductive material is because Ag is suitable for use as an electrode material because of its low specific resistance. In addition, since Ag is a noble metal, it is not easily oxidized and is highly weatherproof.

The shape of the particles of the conductive material is not particularly limited, and may be, for example, spherical or flat. Preferably, the conductive material is a mixture of spherical and flat particles. The average particle diameter of the conductive material is not particularly limited, and may be, for example, about 1.0 μm to about 10 μm.

The particles of the conductive material contact each other, thus providing conduction paths in the first and second resin-containing electrode layers 13b and 14b.

Various types of known thermosetting resins, such as an epoxy resin, a phenolic resin, a urethane resin, a silicone resin, and a polyimide resin, may be used as the resin contained in the first and second resin-containing electrode layers 13b and 14b. In particular, an epoxy resin, which has a high heat resistance, a high moisture resistance, and a high adherence, is one of the most suitable and preferable resins.

The first and second resin-containing electrode layers 13b and 14b preferably include a curing agent in addition to the thermosetting resin. In the case where an epoxy resin is used as a base resin, various types of compounds, such as a phenolic compound, an amine compound, an acid anhydride compound, or an imidazole compound, may be used as a curing agent for the epoxy resin.

The first plating layer 13c covers the first resin-containing electrode layer 13b. The second plating layer 14c covers the second resin-containing electrode layer 14b.

Each of the first and second plating layers 13c and 14c may include a plurality of layers, as described above, and preferably includes a lower plating film and an upper plating film provided on the lower plating film. In this case, each of the lower plating film and the upper plating film is preferably made of, for example, a single type of metal selected from a group including Cu, Ni, Sn, Pb, Au, Ag, Pd, Bi, and Zn, or an alloy plating containing the selected metal. More specifically, the upper plating film is preferably made of Sn or Au, which have high solder wettability. The lower plating film is preferably made of Ni, which has a high barrier performance against solder.

The thickness of each layer (each plating film) included in each of the first and second plating layers 13c and 14c is preferably about 1 μm to about 15 μm, for example.

The first and second resin-containing electrode layers 13b and 14b have a high resistance. Therefore, to reduce the electrical resistance of the outer electrodes 13 and 14, the first and second baked electrode layers 13a and 14a are typically configured so as to have the same or substantially the same length as the length of the first and second resin-containing electrode layers 13b and 14b (see the above-described Japanese Unexamined Patent Application Publication No. 2001-76957).

However, as a result of intensive studies, the inventor of the present invention has discovered that cracking is prevented or minimized under the conditions described below.

When the distance between the first end surface 10e and an edge of a portion of the first baked electrode layer 13a disposed on the second principal surface 10b in the length direction is A, the distance between the first end surface 10e and the effective region a1 in the length direction is B, and the distance between the first end surface 10e and an edge of a portion of the first resin-containing electrode layer 13b disposed on the second principal surface 10b in the length direction is C, the ceramic electronic component 1 satisfies A<B<C, and A/B preferably is about 0.86 or less, for example. Accordingly, cracking of the ceramic electronic component 1 is prevented or minimized and short-circuiting does not easily occur even when cracks occur.

More specifically, when the above-described conditions are satisfied, the edge of the portion of the first baked electrode layer 13a disposed on the second principal surface 10b and the edge of the portion of the first resin-containing electrode layer 13b disposed on the second principal surface 10b are separated from each other by a desired distance. Therefore, even when the ceramic electronic component 1 receives a physical shock or a shock due to the heat cycle, the first and second resin-containing electrode layers 13b and 14b sufficiently function as buffer layers and cracking of the ceramic electronic component 1 is prevented or minimized.

In addition, when the above-described conditions are satisfied, the edge of the portion of the first resin-containing electrode layer 13b disposed on the second principal surface 10b overlaps the effective region a1, which is a region in which the ceramic body 10 has high strength, in the length direction. Therefore, cracking of the ceramic electronic component 1 is prevented or minimized before the resin-containing layers perform buffering, that is, before the resin-containing layers are separated or fractured.

As illustrated in FIG. 2, there may be a case in which the stress cannot be sufficiently absorbed by the resin-containing electrode layers 13b and 14b and a crack Cr is formed so as to extend from the edge of the portion of the first baked electrode layer 13a disposed on the second principal surface 10b. Even in such a case, when the above-described conditions are satisfied, the crack Cr extends toward the ineffective area a2 because the edge of the portion of the first baked electrode layer 13a disposed on the second principal surface 10b does not overlap the effective region a1 and is within the ineffective area a2. Therefore, the crack Cr does not extend toward the effective region a1, and short-circuiting is unlikely to occur.

Here, A/B is preferably about 0.25 or more, more preferably about 0.3 or more, and still more preferably about 0.33 or more, for example. The dimension A is preferably about 115 μm or more when the size of the ceramic electronic component is about 2.0 mm (L)×about 1.25 mm (W), and about 140 μm or more when the size of the ceramic electronic component is about 3.2 mm (L)×about 2.5 mm (W), for example. In this case, not only is short-circuiting prevented, but the first and second baked electrode layers 13a and 14a are reliably formed. This is because in the case where the length of the first and second baked electrode layers 13a and 14a is set to a certain length, when the paste is applied by a dipping method, paste of a certain amount or more is applied to form portions of the first and second baked electrode layers 13a and 14a on the end surfaces. Therefore, even if the paste falls onto a surface plate when the electrode is pulled upward, the risk that no baked electrode layers will be formed on the end surfaces or that the thickness of the first and second baked electrode layers 13a and 14a will be extremely small is greatly reduced or prevented.

The dimension A can be measured by grinding a side surface of the ceramic electronic component in a direction perpendicular or substantially perpendicular to the board surface until the width of the ceramic electronic component is reduced to about ½, and observing the ground surface with an optical microscope. More specifically, the dimension A can be determined by measuring, at the board-surface side of one of the outer electrodes, a distance between an end surface of the ceramic body and an edge of a portion of the baked electrode layer disposed on the second principal surface of the ceramic body in the length direction.

The dimension B can be measured by grinding a side surface of the ceramic electronic component in a direction perpendicular or substantially perpendicular to the board surface until the width of the ceramic electronic component is reduced to about ½, and observing the ground surface with an optical microscope. More specifically, the dimension B can be determined by measuring, from the first end surface, a distance between an end surface of the ceramic body and the effective region of the inner electrodes in the length direction L. The distance between the end surface of the ceramic body and the effective region of the inner electrodes in the length direction is defined as the minimum distance between the end surface of the ceramic body and the effective region of the inner electrodes in the length direction on the cross section.

The dimension C can be measured by grinding a side surface of the ceramic electronic component in a direction perpendicular or substantially perpendicular to the board surface until the width of the ceramic electronic component is reduced to about ½, and observing the ground surface with an optical microscope. More specifically, the dimension C can be determined by measuring, at the board-surface side of one of the outer electrodes, a distance between an end surface of the ceramic body and an edge of a portion of the resin-containing electrode layer disposed on the second principal surface in the length direction.

The dimensions of the inner and outer layer regions can be measured by grinding a side surface of the ceramic electronic component in a direction perpendicular or substantially perpendicular to the board surface until the width of the ceramic electronic component is reduced to about ½, and observing the ground surface with an optical microscope. More specifically, the dimensions of the inner and outer layer regions can be determined by measuring the inner and outer layer regions along a vertical line extending from an end of a resin-containing electrode layer.

Preferably, the first outer electrode 13 satisfies A<B<C, and A/B is about 0.86 or less, for example. In addition, preferably, the second outer electrode 14 satisfies A<B<C, and A/B is about 0.86 or less, for example. Also with the second outer electrode 14, A/B is preferably about 0.25 or more, more preferably about 0.3 or more, and still more preferably about 0.33 or more, for example.

The manufacturing method of the ceramic electronic component 1 is not particularly limited. The ceramic electronic component 1 can be manufactured by, for example, the following non-limiting method.

First, the ceramic body 10 including the first and second inner electrodes 11 and 12 is prepared. More specifically, ceramic green sheets are manufactured by spreading ceramic paste containing ceramic powder in a sheet shape by, for example, screen printing and drying the ceramic paste.

Next, conductive paste for forming the inner electrodes is applied to some of the ceramic green sheets in a desired pattern by, for example, screen printing. Thus, ceramic green sheets on which an inner-electrode-forming conductive pattern is formed and ceramic green sheets on which the inner-electrode-forming conductive pattern is not formed are prepared. A known binder or solvent may be included in the ceramic paste or the conductive paste for forming the inner electrodes.

The dimension B is set by controlling the shape in which the conductive paste for forming the inner electrodes is applied and the amount by which the ceramic green sheets on which the inner electrodes are formed are displaced when they are stacked together.

Next, a mother multilayer body is formed by stacking a desired number of ceramic green sheets on which the inner-electrode-forming conductive pattern is not formed, ceramic green sheets on which the inner-electrode-forming conductive pattern is formed and which are arranged sequentially, and a desired number of ceramic green sheets on which the inner-electrode-forming conductive pattern is not formed, in that order. The mother multilayer body may be pressed in the stacking direction by, for example, isostatic pressing as necessary.

A plurality of raw ceramic bodies are formed by cutting the mother multilayer body into a predetermined shape and size. The edges and corners of the raw ceramic bodies may be rounded by subjecting the raw ceramic bodies to barrel grinding or other suitable method.

Then, the raw ceramic bodies are baked. Thus, the ceramic body 10 is completed. The baking temperature of the raw ceramic bodies may be set in accordance with the ceramic material and the conductive material that are used. For example, the baking temperature of the raw ceramic bodies may be set to about 900° C. to about 1300° C.

Next, the first and second baked electrode layers 13a and 14a are formed by applying conductive paste to both end surfaces of the baked ceramic body 10 and burning the conductive paste. In this process, the dimension A is set by controlling the shape in which the conductive paste is applied. Preferably, the burning temperature is, for example, about 700° C. to about 1000° C. The first and second baked electrode layers 13a and 14a may instead be baked together with the raw ceramic bodies.

Next, conductive resin paste including a conductive material and a resin is applied so as to cover the first and second baked electrode layers 13a and 14a, and are subjected to heat treatment at a temperature of about 150° C. to about 300° C.

so that the resin is thermally cured. Thus, the first resin-containing electrode layer 13b is formed on the first baked electrode layer 13a, and the second resin-containing electrode layer 14b is formed on the second baked electrode layer 14a. In this process, the dimension C is set by controlling the shape in which the conductive resin paste is applied. The heat treatment may either be performed in an air atmosphere or a nitrogen atmosphere. In the case where the resin electrodes are formed by using Cu powder, the oxygen concentration in the heat treatment is preferably set to about 1000 ppm or less to prevent oxidation of the metal component.

Next, the first plating film 13c is formed so as to cover the first resin-containing electrode layer 13b, and the second plating film 14c is formed so as to cover the second resin-containing electrode layer 14b. The first and second plating layers 13c and 14c are formed so as to have a multilayer structure including a Ni plating layer and a Sn plating layer.

The ceramic electronic component 1 can be completed by the above-described processes.

Other preferred embodiments of the present invention will now be described. In the following description, components having the same or substantially the same functions as those of the components of the first preferred embodiment are denoted by the same reference numerals and descriptions thereof are thus omitted.

Second Preferred Embodiment

Figure 3:
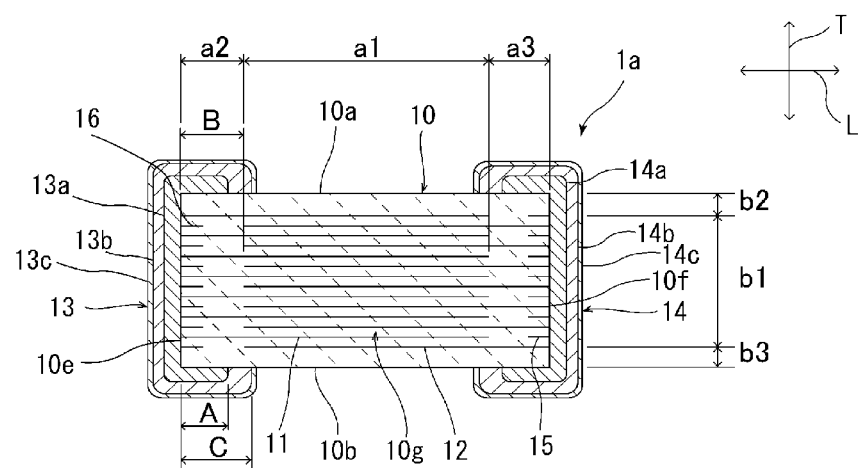
FIG. 3 is a schematic sectional view of a ceramic electronic component according to a second preferred embodiment of the present invention.

FIG. 3 is a schematic sectional view of a ceramic electronic component 1a according to a second preferred embodiment of the present invention.

The structure of the ceramic electronic component 1a illustrated in FIG. 3 differs from the structure of the ceramic electronic component 1 illustrated in FIG. 2 in that first and second dummy electrodes 15 and 16 are provided in a ceramic body 10.

The first dummy electrodes 15 are provided at the same or substantially the same heights as the heights of first inner electrodes 11, and are separated from the first inner electrodes in a length direction. The second dummy electrodes 16 are provided at the same or substantially the same heights as the heights of second inner electrodes 12, and are separated from the second inner electrodes 12 in the length direction.

The first dummy electrodes 15 extend to a second end surface 10f. The second dummy electrodes 16 extend to a first end surface 10e.

Also in the ceramic electronic component 1a, which includes the first and second dummy electrodes 15 and 16, A<B<C is satisfied and A/B preferably is about 0.86 or less, for example. Accordingly, cracking of the ceramic electronic component 1a is prevented or minimized, and short-circuiting is unlikely to occur even when cracks are formed.

Third Preferred Embodiment

Figure 4:
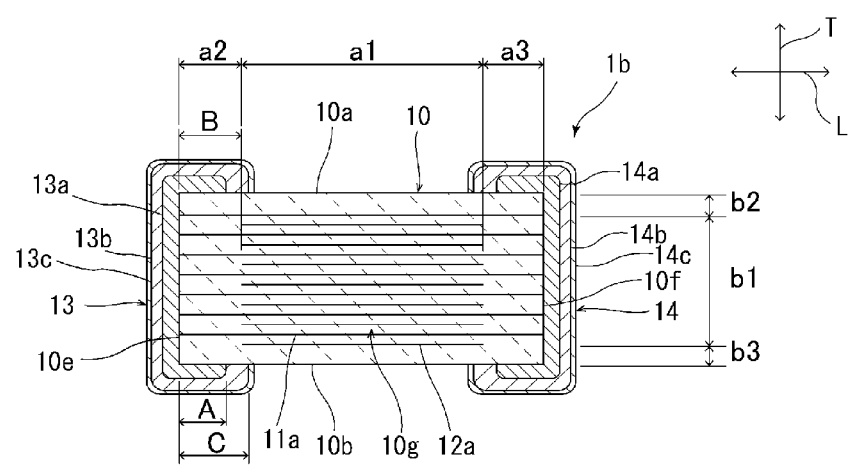
FIG. 4 is a schematic sectional view of a ceramic electronic component according to a third preferred embodiment of the present invention.

FIG. 4 is a schematic sectional view of a ceramic electronic component 1b according to a third preferred embodiment of the present invention.

The structure of the ceramic electronic component 1b illustrated in FIG. 4 differs from the structure of the ceramic electronic component 1 illustrated in FIG. 2 in that first inner electrodes 11a extend to first and second end surfaces 10e and 10f, and in that second inner electrodes 12a extend to first and second side surfaces 10c and 10d. Although not illustrated in FIG. 4, outer electrodes that are electrically connected to the second inner electrodes 12a are provided on the first and second side surfaces 10c and 10d. These outer electrodes and the first and second outer electrodes 13 and 14 define signal terminal electrodes and ground terminal electrodes, respectively, or ground terminal electrodes and signal terminal electrodes, respectively.

Also in the ceramic electronic component 1b of the present preferred embodiment, the first and second outer electrodes 13 and 14 satisfy A<B<C, and A/B preferably is about 0.86 or less, for example. Accordingly, cracking of the ceramic electronic component 1b is prevented or minimized, and short-circuiting is not likely to occur even when cracks are formed.

Preferred embodiments of the present invention will now be described in more detail by way of examples. However, the present invention is not limited to the following examples in any way, and modifications can be made as appropriate within the scope of the present invention.

Examples 1 to 5

As examples of the ceramic electronic component 1 according to the above-described preferred embodiments, ceramic capacitors similar to the ceramic electronic component 1 according to the first preferred embodiment were manufactured by using the above-described manufacturing method. Twenty ceramic capacitors were manufactured for each example under the conditions given below. Five types of ratios A/B were set (Examples 1 to 5) by changing the dimension A (see Table 1 below), and occurrences of cracks and short-circuiting were observed.

Size of Ceramic Capacitors: 2.0 mm (L)×1.25 mm (W)× 1.25 mm (T) (design values)
Ceramic: $BaTiO_3$
Capacity: 1 μF
Rated Voltage: 16 V
Baking Temperature: 1200° C. (kept for 2 hours)
Thickness of Inner Layer Region: 180 μm
Thickness of Outer Layer Regions: 5.4 μm
Material of Baked Electrode Layers: Cu
Conductive Material of Resin-Containing Electrode Layers: Ag
Resin of Resin-Containing Electrode Layers: Epoxy Resin
Heat-Curing Temperature: 200° C.
Target Thickness of Resin-Containing Electrode Layers: 50 μm (Target Value in Central Regions of End Surfaces)
Structure of Plating Layers: Two-Layer Structure Including Ni and Sn Layers
Target Thickness of Plating Layers: 2.5 μm (Ni) and 3 μm (Sn) (Target Value in Central Regions of End Surfaces)

The samples were mounted on land boards according to the standards of Japan Electronics and Information Technology Industries Association (JEITA) by reflow soldering using lead free (LF) solder, and the mounting boards were bent by a predetermined bending amount (about 8 mm) for about 5 seconds. Then, the samples were removed from the boards, and a side surface of each sample was ground to a central position of the sample in the width direction. Then, occurrence of cracks that extend from the edges of the baked electrode layers on the ground surface of each sample was observed.

The samples were mounted on the land boards according to the standards of JEITA by reflow soldering using LF solder, and the mounting boards were bent by a predetermined bending amount (about 8 mm) for about 5 seconds. Then, the samples were removed from the boards, and a side surface of each sample was ground to a central position of the sample in the width direction. Then, the occurrence of cracks that extend from the edges of the resin-containing electrode layers on the ground surface of each sample was observed.

Each sample was mounted on a glass epoxy board by using LF solder. Then, each sample was subjected to an accelerated humidity load test for about 72 hours by applying a rated voltage to the sample in a high-temperature high-humidity bath at a temperature of about 125° C., a relative humidity of about 95% RH, and a pressure of about 1.2 atm. It was determined that short-circuiting occurred when the insulation resistance (IR) value was reduced by two orders of magnitude or more.

After the baked electrode layers were formed, the end surfaces were visually observed by using a lens with a magnification of 2×. In the visual observation, it was determined that a failure had occurred when the ceramic body was exposed.

Comparative Examples 1 to 16

As comparative examples for the ceramic electronic component 1 according to the above-described first preferred embodiment, ceramic capacitors similar to the ceramic electronic component 1 according to the above-described first preferred embodiment were manufactured by using the above-described manufacturing method. Twenty ceramic capacitors were manufactured for each comparative example under the same conditions as the conditions for manufacturing the ceramic capacitors of the above-described examples. Eight types of ratios A/B were set (Comparative Examples 1 to 8) by changing the dimensions A and C (see Table 1 below), and occurrences of cracks and short-circuiting were observed.

The results of Examples 1 to 5 and Comparative Examples 1 to 8 are shown in Table 1.

TABLE 1

| | Dimension A (μm) | Dimension B (μm) | Dimension C (μm) | A/B | No. of Cracks Extending from Edges of Baked Electrode Layers/ No. of Samples | No. of Cracks Extending from Edges of Resin-Containing Electrode Layers/No. of Samples | No. of Occurrences of Short-Circuiting/ No. of Samples | No. of Occurrences of Baked Electrode Layer Formation Failure on End Surfaces/No. of Samples |
|---|---|---|---|---|---|---|---|---|
| Comparative Example 1 | 80 | 350 | 500 | 0.23 | 0/20 | 0/20 | 0/20 | 3/1000 |
| Example 1 | 115 | 350 | 500 | 0.33 | 1/20 | 0/20 | 0/20 | 0/1000 |
| Example 2 | 150 | 350 | 500 | 0.43 | 0/20 | 0/20 | 0/20 | 0/1000 |
| Example 3 | 200 | 350 | 500 | 0.57 | 0/20 | 0/20 | 0/20 | 0/1000 |
| Example 4 | 250 | 350 | 500 | 0.71 | 0/20 | 0/20 | 0/20 | 0/1000 |
| Example 5 | 300 | 350 | 500 | 0.86 | 0/20 | 0/20 | 0/20 | 0/1000 |
| Comparative Example 2 | 325 | 350 | 500 | 0.93 | 0/20 | 0/20 | 1/20 | 0/1000 |
| Comparative | 350 | 350 | 500 | 1.00 | 0/20 | 0/20 | 2/20 | 0/1000 |

TABLE 1-continued

| | Dimension A (µm) | Dimension B (µm) | Dimension C (µm) | A/B | No. of Cracks Extending from Edges of Baked Electrode Layers/ No. of Samples | No. of Cracks Extending from Edges of Resin-Containing Electrode Layers/No. of Samples | No. of Occurrences of Short-Circuiting/ No. of Samples | No. of Occurrences of Baked Electrode Layer Formation Failure on End Surfaces/No. of Samples |
|---|---|---|---|---|---|---|---|---|
| Example 3 Comparative Example 4 | 115 | 350 | 200 | 0.33 | 3/20 | 2/20 | 0/20 | 0/1000 |
| Comparative Example 5 | 150 | 350 | 200 | 0.43 | 6/20 | 3/20 | 0/20 | 0/1000 |
| Comparative Example 6 | 200 | 350 | 200 | 0.57 | 13/20 | 2/20 | 1/20 | 0/1000 |
| Comparative Example 7 | 250 | 350 | 200 | 0.71 | 18/20 | 1/20 | 4/20 | 0/1000 |
| Comparative Example 8 | 300 | 350 | 200 | 0.86 | 20/20 | 0/20 | 13/20 | 0/1000 |

As is clear from the above-described results, with the ceramic capacitors in which A<B<C is satisfied and A/B preferably is about 0.86 or less, cracking is effectively prevented or at least minimized, and short-circuiting does not occur even when cracks are formed.

Examples 6 to 10

As examples of the ceramic electronic component 1 according to the above-described first preferred embodiment, ceramic capacitors similar to the ceramic electronic component 1 according to the above-described first preferred embodiment were manufactured by using the above-described manufacturing method. Twenty ceramic capacitors were manufactured for each example under the conditions given below. Five types of ratios A/B were set (Examples 6 to 10) by changing the dimension A (see Table 2 below), and occurrences of cracks and short-circuiting were observed.

Size of Ceramic Capacitors: 3.2 mm (L)×2.5 mm (W)×2.5 mm (T) (design values)

Ceramic: $BaTiO_3$

Capacity: 4.7 µF

Rated Voltage: 50V

Baking Temperature: 1200° C. (kept for 2 hours)

Thickness of Inner Layer Region: 130 µm

Thickness of Outer Layer Regions: 7.2 µm

Material of Baked Electrode Layers: Cu

Conductive Material of Resin-Containing Electrode Layers: Ag

Resin of Resin-Containing Electrode Layers: Epoxy Resin

Heat-Curing Temperature: 200° C.

Target Thickness of Resin-Containing Electrode Layers: 50 µm (Target Value in Central Regions of End Surfaces)

Structure of Plating Layers: Two-Layer Structure Including Ni and Sn Layers

Target Thickness of Plating Layers: 2.5 µm (Ni) and 3 µm (Sn) (Target Value in Central Regions of End Surfaces)

The results of Examples 6 to 10 and Comparative Examples 9 to 16 are shown in Table 2.

TABLE 2

| | Dimension A (µm) | Dimension B (µm) | Dimension C (µm) | A/B | No. of Cracks Extending from Edges of Baked Electrode Layers/ No. of Samples | No. of Cracks Extending from Edges of Resin-Containing Electrode Layers/No. of Samples | No. of Occurrences of Short-Circuiting/ No. of Samples | No. of Occurrences of Baked Electrode Layer Formation Failure on End Surfaces/No. of Samples |
|---|---|---|---|---|---|---|---|---|
| Comparative Example 9 | 100 | 425 | 600 | 0.24 | 1/20 | 0/20 | 0/20 | 12/1000 |
| Example 6 | 115 | 350 | 500 | 0.33 | 1/20 | 0/20 | 0/20 | 0/1000 |
| Example 7 | 150 | 350 | 500 | 0.43 | 0/20 | 0/20 | 0/20 | 0/1000 |
| Example 8 | 200 | 350 | 500 | 0.57 | 0/20 | 0/20 | 0/20 | 0/1000 |
| Example 9 | 250 | 350 | 500 | 0.71 | 0/20 | 0/20 | 0/20 | 0/1000 |
| Example 10 | 300 | 350 | 500 | 0.86 | 0/20 | 0/20 | 0/20 | 0/1000 |
| Comparative Example 10 | 325 | 350 | 500 | 0.93 | 0/20 | 0/20 | 1/20 | 0/1000 |
| Comparative Example 11 | 350 | 350 | 500 | 1.00 | 0/20 | 0/20 | 2/20 | 0/1000 |
| Comparative Example 12 | 115 | 350 | 300 | 0.33 | 3/20 | 2/20 | 0/20 | 0/1000 |
| Comparative Example 13 | 150 | 350 | 300 | 0.43 | 3/20 | 2/20 | 3/20 | 0/1000 |
| Comparative Example 14 | 200 | 350 | 300 | 0.57 | 3/20 | 1/20 | 0/20 | 0/1000 |
| Comparative Example 15 | 250 | 350 | 300 | 0.71 | 3/20 | 1/20 | 3/20 | 0/1000 |
| Comparative Example 16 | 300 | 350 | 300 | 0.86 | 12/20 | 1/20 | 8/20 | 0/1000 |

As is clear from the above-described results, with the ceramic capacitors in which A<B<C is satisfied and A/B preferably is about 0.86 or less, cracking is effectively prevented or at least minimized, and short-circuiting does not easily occur even when cracks are formed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
   a ceramic body including first and second principal surfaces that extend in a length direction and a width direction, first and second side surfaces that extend in the length direction and a thickness direction, and first and second end surfaces that extend in the width direction and the thickness direction;
   first and second inner electrodes that are arranged in the ceramic body and that are opposed to each other in the thickness direction; and
   an outer electrode that is electrically connected to the first inner electrode or to the second inner electrode and that extends from the first end surface to the second principal surface; wherein
   the ceramic body includes:
      an effective region in which the first and second inner electrodes are opposed to each other in the thickness direction; and
      a region that is closer to the first end surface than the effective region is and in which one of the first and second inner electrodes is disposed;
   the outer electrode includes:
      a baked electrode layer provided on the ceramic body; and
      a resin-containing electrode layer that includes a conductive material and a resin and that covers the baked electrode layer; and
   when a distance between the first end surface and an edge of a portion of the baked electrode layer disposed on the second principal surface in the length direction is A, a distance between the first end surface and the effective region in the length direction is B, and a distance between the first end surface and an edge of a portion of the resin-containing electrode layer disposed on the second principal surface in the length direction is C, A<B<C is satisfied and A/B is about 0.86 or less.

2. The ceramic electronic component according to claim 1, wherein A/B is about 0.33 or more.

3. The ceramic electronic component according to claim 1, wherein the ceramic body is made of a dielectric ceramic material.

4. The ceramic electronic component according to claim 1, wherein the dielectric ceramic material is one of $BaTiO_3$, $CaTiO_3$, $SrTiO_3$, and $CaZrO_3$.

5. The ceramic electronic component according to claim 1, wherein the ceramic body is made of a piezoelectric ceramic material.

6. The ceramic electronic component according to claim 1, wherein the ceramic body is made of lead zirconate titanate ceramic.

7. The ceramic electronic component according to claim 1, wherein the ceramic body is made of a semiconductor ceramic material.

8. The ceramic electronic component according to claim 1, wherein the ceramic body is made of a magnetic ceramic material.

9. The ceramic electronic component according to claim 1, wherein the first and second inner electrodes are made of a metal selected from a group including Ni, Cu, Ag, Pd, and Au, or an alloy containing at least one of Ni, Cu, Ag, Pd, and Au.

10. The ceramic electronic component according to claim 1, wherein a thickness of each of the first and second inner electrodes is about 0.2 µm to about 2.0 µm.

11. The ceramic electronic component according to claim 1, wherein the outer electrode extends from the first end surface to the first principal surface and to the first and second side surfaces.

12. The ceramic electronic component according to claim 1, wherein the baked electrode layer is made of a conductive paste including a conductive metal and a glass.

13. The ceramic electronic component according to claim 12, wherein the conductive metal is at least one of Cu, Ni, Ag, Pd, an Ag—Pd alloy, or Au.

14. The ceramic electronic component according to claim 12, wherein the glass includes at least one of B, Si, Ba, Mg, Al, or Li.

15. The ceramic electronic component according to claim 1, wherein the resin-containing electrode layer includes a conductive material and a resin.

16. The ceramic electronic component according to claim 15, wherein the conductive material is one of Ag or a metal powder coated with Ag.

17. The ceramic electronic component according to claim 16, wherein particles of the conductive material have spherical or flat shapes.

18. The ceramic electronic component according to claim 15, wherein the resin is one of epoxy resin, phenolic resin, urethane resin, silicone resin, and polyimide resin.

19. The ceramic electronic component according to claim 1, wherein A/B is about 0.25 or more.

20. The ceramic electronic component according to claim 1, wherein A/B is about 0.30 or more.

* * * * *